United States Patent Office 3,224,986
Patented Dec. 21, 1965

3,224,986
CATIONIC EPICHLOROHYDRIN MODIFIED POLYAMIDE REACTED WITH WATER-SOLUBLE POLYMERS
Robert W. Butler, Wilmington, Del., and Gerald I. Keim, West Grove, Pa., assignors to Hercules Powder Company, Wilmington, Del., a corporation of Delaware
No Drawing. Filed Apr. 18, 1962, Ser. No. 188,558
The portion of the term of the patent subsequent to Feb. 23, 1977, has been disclaimed
10 Claims. (Cl. 260—9)

This application is a continuation-in-part of our abandoned application for United States Letters Patent Serial No. 762,245, filed September 22, 1958, entitled "Treatment of Water-Soluble Polymers" which in turn is a continuation-in-part of our presently abandoned application for United States Letters Patent Serial No. 691,542, filed October 22, 1957, entitled "Treatment of Water-Soluble Polymers."

This invention relates to new and improved water-insoluble polymers and to a method of making them from water-soluble polymers.

For many years the art has sought a simple, economical and practical method of insolubilizing water-soluble polymers, but insofar as we know, no method has been developed which is as satisfactory as desired. The desirability of being able to apply the polymer in the water-soluble state and to render it water-insoluble after using as a protective coating or otherwise is obvious in the art.

An object of this invention is to provide new and improved water-insoluble polymers and a method of making them from water-soluble polymers. Another object of this invention is to provide a method of making water-insoluble polymers of improved properties. Still another object of this invention is a method of making water-insoluble polymers characterized by the advantages that the polymers are used in the easily handled water-soluble state and thereafter converted to the highly durable water-insoluble state under very mild and economical conditions. A further object is such a method also characterized by the advantages that the polymers are insolubilized with highly stable resins. The above and other objects will be apparent from the description of this invention given hereinafter.

The above and other objects of preparing a highly water-insoluble and highly water-insensitive product are accomplished according to this invention by carrying out the process which comprises the steps of (1) reacting at a temperature of 110° C.–250° C. for ¼ hour–2 hours a polyalkylene polyamine and a saturated dicarboxylic acid having 3–10 carbon atoms employing a polyalkylene polyamine/dicarboxylic acid mole ratio of 0.8/1–1.4/1, thereby producing a polyamide, said polyalkylene polyamine having the formula $H_2N\text{+}(C_nH_{2n})NH\text{+}_y C_nH_{2n}NH_2$ where $n$ is an integer of at least 2 and $y$ is an integer of at least 1 to 7, (2) reacting at a temperature of 45° C.–100° C. said polyamide with epichlorohydrin employing a mole ratio of epichlorohydrin/secondary amine groups of said polyamide of 0.5/1–1.8/1, said reaction being continued until the reaction mixture has reached a Gardner viscosity of B–E and M–X in preparing a 25% and a 50% solids resins, respectively, (3) reducing the pH of an aqueous solution of said polyamide-epichlorohydrin reaction product to such an extent that 10% and 25% aqueous solutions thereof have a pH of not in excess of 6 and 4, respectively, thereby producing a highly stable cationic water-soluble thermosetting resin free of epoxide groups, (4) reacting an aqueous solution of said stable cationic thermosetting resin with an aqueous solution of a water-soluble polymer at a pH of 1.5–12, the amount of said stable cationic thermosetting resin employed being 0.5%–20% by weight of said water-soluble polymer, and (5) finally drying said resin-polymer, aqueous solution, said water-soluble polymer having a group selected from those consisting of carboxyl, hydroxyl, amine and amide groups and any combination of said groups, the major part of said water-soluble polymer comprising at least 10 monomer units, said water-soluble polymer being selected from the group consisting of cellulose derivatives, starches, starch derivatives, vegetable gums, proteins and synthetic polymers. We have found according to the instant invention that this gives not only a highly water-insoluble product but one which is also quite water-insensitive and yet permits one to use the mixture in a water-soluble state.

The terms "water-soluble" and "water-insoluble" as used herein with reference to the materials which may be modified by said resin and with reference to the products of this invention are intended to include water-sensitive materials and water-insensitive products as well as water-soluble materials and water-insoluble products. The term "resin" is used herein to mean a highly stable water-soluble polymeric reaction product of epichlorohydrin and a polyamide derived from a polyalkylene polyamine (as herein defined) and a saturated aliphatic dibasic carboxylic acid having 3 to 10 carbon atoms.

This invention is applicable to modifying water-soluble polymers which contain either carboxy, hydroxyl, amine or amide groups or any combination of said groups, and major part of each of said polymers containing at least 10 monomer units, and this is the sense in which the term "water-soluble polymers" is used in the claims and elsewhere herein. Typical examples of such water-soluble polymers include the following and the like: cellulose derivatives, e.g., carboxyalkyl celluloses such as carboxymethylcellulose, hydroxyalkyl celluloses such as hydroxyethyl cellulose, carboxyalkyl hydroxyalkyl celluloses such as carboxymethyl hydroxyethyl cellulose, sulfoalkyl celluloses such as sulfoethyl cellulose, alkyl celluloses such as methyl cellulose, alkyl hydroxyalkyl celluloses such as ethyl hydroxyethyl cellulose, alkylene celluloses such as allyl cellulose, alkylene alkyl celluloses such as allyl ethyl cellulose, and various other substituted celluloses, either in the free acid form or water-soluble salts thereof such as alkali metal and ammonium salts; starches, e.g. potato starch, wheat starch and corn starch; starch derivatives, e.g. carboxymethylated starch, hydroxyethylated starch and oxidized starches; vegetable gums, e.g. algin, guar gum, locust bean gum, gum tragacanth, gum arabic agar, psyllium seed, Irish moss, and water-soluble salts thereof such as alkali metal and ammonium salts; proteins such as casein, gelatin, animal glue, and soybean protein; synthetic polymers, e.g. poly(vinyl alcohol), polyacrylic acid and substituted polyacrylic acid such as polymethacrylic acid, water-soluble copolymers derived from maleic anhydride such as maleic anhydride-styrene copolymers, and water-soluble salts thereof such as alkali metal and ammonium salts; polyamides such as polyacrylamide; polymeric amines such as polyvinylamine and polyethylenimine; and so on.

In the preparation of the cationic resins contemplated for use herein, the dibasic carboxylic acid is first reacted with the polyalkylene polyamine under conditions such as to produce a water-soluble polyamide containing the recurring groups

where $n$ and $x$ are each 2 or more and R is the divalent hydrocarbon radical of the dibasic carboxylic acid. This water-soluble polyamide is then reacted with epichlorohydrin to form the highly stable water-soluble cationic thermosetting resin.

The polyamides utilized in preparing these resins are obtained by reacting a $C_3$–$C_{10}$ saturated aliphatic dibasic carboxylic acid with a polyalkylene polyamine, preferably in aqueous solution. The saturated aliphatic dibasic acids having from 4 to 8 carbon atoms in the molecule are preferred. Blends of two or more of the saturated aliphatic dibasic carboxylic acids may also be used. Typical acids suitable for use herein include, for example, adipic, succinic, azelaic, diglycollic, oxalic, glutaric, suberic, sebacic, malonic, and the like.

A variety of polyalkylene polyamines including polyethylene polyamines, polypropylene polyamines, polybutylene polyamines and so on may be employed herein of which the polyethylene polyamines represent an economically preferred class. More specifically, the polyalkylene polyamines of this invention are polyamines containing two primary amine groups and at least one secondary amine group in which the nitrogen atoms are linked together by groups of the formula —$C_nH_{2n}$— where $n$ is a small integer greater than unity and the number of such groups in the molecule ranges from two up to about eight and preferably up to about four. The nitrogen atoms may be attached to adjacent carbon atoms in the group —$C_nH_{2n}$— or to carbon atoms further apart, but not to the same carbon atom. This invention contemplates not only the use of such polyamines as diethylenetriamine, triethylenetetramine, tetraethylenepentamine, dipropylenetriamine, and the like, which can be obtained in reasonably pure form, but also mixtures and various crude polyamine materials. For example, the mixture of polyethylene polyamines obtained by the reaction of ammonia and ethylene dichloride, refined only to the extent of removal of chlorides, water, excess ammonia, and ethylenediamine, is a very satisfactory starting material. Most preferred are the polyethylene polyamines containing from two to four ethylene groups, two primary amine groups, and from one to three secondary amine groups.

The term "polyalkylene polyamine" employed in the claims, therefore, refers to and includes any of the polyalkylene polyamines referred to above or to a mixture of such polyalkylene polyamines. These polyalkylene polyamines may be represented by the formula

where $n$ is an integer of at least 2 and $y$ is an integer of at least 1 to 7.

It is desirable, in some cases, to increase the spacing of secondary amine groups on the polyamide molecule in order to change the reactivity of the polyamide-epichlorohydrin complex. This can be accomplished by substituting an aliphatic diamine such as ethylenediamine, propylenediamine, hexamethylenediamine or a heterocyclic diamine such as piperazine or the like for a portion of the polyalkylene polyamine. For this purpose up to about 60% of the polyalkylene polyamine may be replaced by a molecularly equivalent amount of the diamine. Usually a replacement of about 30% or less will serve the purpose.

The temperature employed for carrying out the reaction between the dibasic acid and the polyalkylene polyamine in preparing the polyamide may vary from 110° C. to 250° C. at atmospheric pressure. However, temperatures between 160° C. and 210° C. are preferred. Where reduced pressures are employed, somewhat lower temperatures may be used. The reaction time depends on the temperature and pressure used and will vary from ½ to 2 hours. In any event, the reaction is desirably continued to substantial completion for best results.

In carrying out the reaction, we must use an amount of dibasic acid sufficient to react substantially completely with the primary amine groups of the polyalkylene polyamine but insufficient to react with the secondary amine groups to any substantial extent. This requires a mole ratio of polyalkylene polyamine to dibasic acid of 0.8/1–1.4/1, preferably 0.9/1–1.2/1. Mole ratios outside of these ranges are unsatisfactory. Thus, mole ratios below 0.8/1 result in a gelled product or one having a pronounced tendency to gel, while mole ratios above 1.4/1 result in unsatisfactorily low molecular weight polyamides for the purposes of the present invention.

In converting the polyamide, formed as above described, to a highly stable cationic thermosetting resin, it must be reacted with epichlorohydrin at a temperature of 45° C.–100° C., preferably 45° C.–70° C. This reaction is carried out in aqueous solution to moderate the reaction. The extent to which this reaction is carried is quite critical for the purposes of the present invention. The extent of reaction is determined by the viscosity of the reaction product—the greater the extent of reaction, the greater the viscosity. The extent of reaction required will also vary with the solids content (i.e. percent by weight solids in reaction mixture at end of polyamide-epichlorohydrin reaction) of the resin product prepared. For instance, when preparing 25% solids resins the extent of the reaction must be such that the viscosity (Gardner) of the reaction mixture reaches B–E at end of the reaction. For 50% solids resins this viscosity must be M–X. Below these values, the resins are not as efficient as desired for the purposes of the present invention and above these values the resins are not as stable as desired for the purposes of the present invention.

When the required viscosity is reached during the preparation of the resin, sufficient water is then added to adjust the solids content of the resin solution to the desired concentration, the product is cooled to about 25° C. and then stabilized by adding acid to reduce the pH. Suitable acids include hydrochloric, sulfuric, nitric, formic, phosphoric and acetic acid, either alone or in combination.

In order for the resins to be operable in the present invention, they must be highly stable. The extent to which the resins may be stabilized after preparation depends on the degree to which the pH of their aqueous solutions are reduced—the lower the pH the higher the stability of resins of a given concentration of resin solids in the final product. The higher the concentration of resin solids in the final product, the lower the pH required to adequately stabilize the product. The maximum concentration of the resin solids in the final aqueous solution product is also critical according to this invention, because above this concentration the resins are not as stable as desired for purposes of the present invention irrespective of the extent to which their pH is reduced. Although the minimum concentration of the resin solids in the final aqueous solution product is not critical from a technical standpoint, it is important from a practical standpoint because of the cost of shipping and handling the excess water. For this reason, preferably the concentration of resin in the final aqueous solution product will be at least about 10%. Thus, we find that for final products having resin solids concentrations of 10% and 25%, their pH must be not in excess of 6 and 4, respectively. Unless the pH requirements of the final products are met, they do not insolubilize to the extent required in accordance with the present invention even if they have been prepared under the other critical conditions disclosed herein. Although not necessary in accordance with the present invention, the pH of the reaction mixture may also be reduced by addition of acid prior to the reaction of the polyamide with epichlorohydrin.

When the aqueous solutions of the final resin products of our invention are stabilized by reducing the pH thereof as specified herein, any epoxide groups present are hydrolyzed or otherwise converted to other groups. For instance:

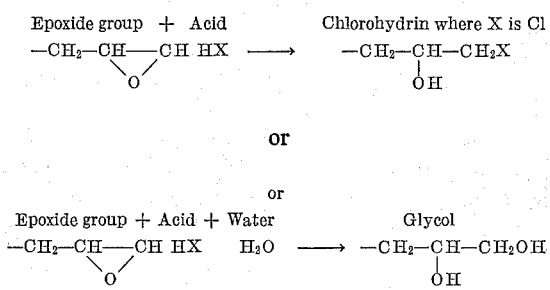

In order for the resins to be operable in accordance with the present invention, the amount of epichlorohydrin used in converting the polyamide to the resin product is critical and must be 0.5–1.8 moles of epichlorohydrin for each secondary amine group of the polyamide. Operating outside this range gives resins unsuitable for the purposes of the present invention. The preferred amount of epichlorohydrin is 1.0–1.5 moles for each secondary amine group of the polyamide.

The following examples illustrate specific ways of preparing the above-described resins. These examples are not intended to limit the present invention beyond the scope set forth in the attached claims.

EXAMPLE 1

Two hundred twenty-five grams (2.18 moles) of diethylenetriamine and 100 grams of water were placed in a 3-necked flask equipped with a mechanical stirrer, thermometer and condenser. To this was added 290 grams (2.0 moles) of adipic acid. After the acid had dissolved in the amine, the solution was heated to 185° C.–200° C. and held there for 1½ hours. Then vacuum from a water pump was applied to the flask during the period required for the contents of the flask to cool to 140° C. following which 430 grams of $H_2O$ was added. The polyamide solution contained 52.3% soilds and had an acid number of 2.1.

To 60 grams of this polyamide solution in a round-bottom flask was added 225 grams of $H_2O$. This solution was heated to 50° C. and 12.5 grams of epichlorohydrin was added dropwise over a period of 11 minutes. The contents of the flask was then heated to 60° C.–70° C. until it had attained a Gardner viscosity of E. It contained approximately 25% solids. Then the product was diluted with water and it was cooled to 25° C. Eleven ml. of 10% HCl was then added to adjust the pH to 5.0. The final product contained 9.0% solids and had a Gardner viscosity of C–D. It was still stable at room temperature after 30 days.

EXAMPLE 2

A polyamide prepared according to the procedure outlined in Example 1 was converted to a stable resin as follows:

To a solution of 474 grams (252 grams dry basis) of the polyamide in 155 grams of water, adjusted to pH 6.0 with 24.4 ml. of concentrated sulfuric acid and heated to 50° C., was added with stirring 124 grams of epichlorohydrin over a period of 4 minutes. The temperature of the solution was raised to 60° C. for 1 hour and 20 minutes and then to 65° C. for 1 hour and 2 minutes. At the end of this time, polymerization had proceeded to a Gardner viscosity of M. The product was treated with 4.5 ml. of concentrated sulfuric acid and cooled to 25° C. The pH was then adjusted to 2.2 by the addition of 2 ml. of concentrated sulfuric acid. The product was stable at room temperature for more than 180 days. It contained 49.3% solids (105° C. oven for 3 hours) and had a Gardner viscosity of M (Brookfield viscosity of 476.0 cps. at 25° C.). The product was diluted with water to approximately 25% solids.

The following examples are to illustrate the invention and not to limit its scope beyond the appended claims. In the examples percent and parts are by weight unless otherwise indicated. In each example a 2% aqueous solution of the resin was mixed with a 2% aqueous solution of the water-soluble polymer, the resulting solution was adjusted to the desired pH with hydrochloric acid or sodium hydroxide and films of the resulting solution were cast and dried on a glass plate. Solubility of the film was determined by measuring the loss in weight of a one-mil thick dried film after immersing 24 hours in water at 73° F. Percent swell was determined by measuring the increase in length of a one-mill thick dried film after immersing in water at 73° F. for 24 hours and expressing the increase in length of the film as a percentage of the original length. Elongation was determined on a one-mil thick dried film by conventional methods while making standard tensile strength measurements (i.e., elongation employing a load which gives elongation to break). In the examples where the film is reported as insoluble without giving the percent insoluble, the film retained its shape after the above water-soaking without any appreciable swelling.

In the examples CMC, CMHEC, and CMS mean carboxymethylcellulose, carboxymethyl hydroxyethyl cellulose, and carboxymethyl starch, respectively, and all are in the form of the water-soluble sodium salt thereof, except as indicated in Example 15 where the water-soluble ammonium salt of CMC is used. Elsewhere in this application where these terms or abbreviations are used they include these materials either in the form of their water-soluble salts or their free acid form. In the examples HEC means hydroxyethyl cellulose and CS means cellulose sulfate.

EXAMPLES 3–12

Table 1

These examples show the use under many different conditions of $NH_4CMC$ and various types of NaCMC (sodium carboxymethylcellulose) as applied to this invention.

TABLE 1

| Example | 3 | 4 | 5 | 6 | 7 | 8 |
|---|---|---|---|---|---|---|
| CMC Type | 70 M [1] | 70 M | 70 H [2] | 70 H | 70 M | 70 M. |
| Resin as percent of CMC | None | 20 | 20 | 20 | 2 | 20. |
| Resin used made per Example | 1 | 1 | 1 | 1 | 1 | 1. |
| pH of Solution before Casting | 7.0 | 11 | 8.0 | 8.0 | 8.0 | 6.2. |
| Film Drying | ([4]) | ([3]) | ([3]) | ([4]) | ([4]) | ([5]). |
| Film Properties: | | | | | | |
| Solubility | Soluble | Insoluble | Insoluble | Insoluble | Partially Soluble | Insoluble. |
| Percent Insoluble | 0 | 90 | 96 | 96 | 62 | |
| Tensile Strength, p.s.i. | 8,590 | | 9,000 | 8,000 | | |
| Percent Elongation | 7 | | 4 | 8 | | |
| Flexibility | Good | | Good | Good | Good | Good. |
| Percent Swell | | 31 | 36 | 12 | | 12. |

| Example | 9 | 10 | 11 | 12 | 13 |
|---|---|---|---|---|---|
| CMC Type | 70 M | 70 M | 70 M | 70 M | NH$_4$CMC. |
| Resin as percent of CMC | 10 | 40 | 20 | 15 | 20. |
| Resin used made per Example | 1 | 1 | 1 | 1 | 1. |
| pH of Solution before Casting | 10.5 | 6.6 | 1.5 | 6.8 | 8.0. |
| Film Drying | ([4]) | ([4]) | ([3]) | ([4]) | ([4]). |
| Film Properties: | | | | | |
| Solubility | Insoluble | Insoluble | Insoluble | Insoluble | Insoluble. |
| Percent Insoluble | 90 | >90 | 80 | >90 | 90. |
| Tensile Strength, p.s.i. | | | | 12,700 | |
| Percent Elongation | | | | 8 | |
| Flexibility | Good | Good | Good | Good | Good. |
| Percent Swell | | 18 | 6 | | 6. |

[1] Hercules Medium-Viscosity CMC, D.S. 0.89, viscosity 800 cps. at 2%.
[2] Hercules High-Viscosity CMC, D.S. 0.74, viscosity 1000 cps. at 1%.
[3] 24 hours at room temperature.
[4] 1 hour at 70° C.
[5] 0.5 hour at 105° C.

EXAMPLES 14–27

Table 2

These examples show the use of various water-soluble polymers besides carboxymethylcellulose in this invention, including other cellulose ethers, cellulose esters, starches, starch derivatives, synthetic water-soluble polymers, gelatin, and gums.

TABLE 2

| Example | 14 | 15 | 16 | 17 | 18 | 19 | 20 | 21 | 22 |
|---|---|---|---|---|---|---|---|---|---|
| Polymer | CMHEC [1] | HEC [2] | CS [3] | Potato Starch | Wheat Starch | CMS [4] | Algin | Guar Gum | Locust Bean Gum. |
| Resin as Percent of Polymer | 20 | 10 | 20 | 10 | 10 | 20 | 20 | 20 | 20. |
| Resin used made per Example | 1 | 1 | 1 | 1 | 1 | 1 | 1 | 1 | 1. |
| pH of Solution before Casting | 7.0 | 8.0 | 8.0 | 5.5 | 8.0 | 9.0 | 6.8 | 5.0 | 4.7. |
| Film Drying | ([5]) | ([5]) | ([5]) | ([5]) | ([5]) | ([5]) | ([5]) | ([5]) | ([5]). |
| Film Properties: | | | | | | | | | |
| Solubility | Insoluble | Insoluble | Insoluble | Insoluble | Insoluble | Insoluble | Insoluble | Insoluble | Insoluble. |
| Percent Insoluble | 18 | 91 | | 96 | 90 | 90 | 92 | | 88. |
| Percent Swell | | | | | | | 12 | | |

| Example | 23 | 24 | 25 | 26 | 27 |
|---|---|---|---|---|---|
| Polymer | Gelatin [7] | Poly(vinyl alcohol) [9] | Polyacrylic Acid [10] | Polyamide [11] | Maleic Anhydride Copolymer.[12] |
| Resin as Percent of Polymer | 20 | 20 | 20 | 20 | 20. |
| Resin used made per Example | 1 | 1 | 1 | 1 | 1. |
| pH of Solution before Casting | 7.5 | 7.5 | 9.2 | 8.0 | 7.7. |
| Film Drying | ([8]) | ([8]) | ([6]) | ([6]) | ([6]). |
| Film Properties: | | | | | |
| Solubility | Insoluble | Partially Soluble | Insoluble | Insoluble | Insoluble. |
| Percent Insoluble | 92 | 70 | 81 | 85 | >95. |

[1] D.S. CM 0.36, HE 0.76, Viscosity 780 cps. at 2%.
[2] D.S. 1.6. Viscosity 6,800 cps. at 2%.
[3] D.S. 0.31. Viscosity 1,000 cps. at 2%.
[4] Carboxymethylated wheat starch. D.S. 0.67. Viscosity 1,180 cps. at 2%.
[5] 1 hour at 70° C.
[6] 0.5 hour at 105° C.
[7] 205 Bloom gelatin.
[8] Substantially to dryness at 65° C. under a vacuum of 30 inches of mercury.
[9] Elvanol type 32-70 by du Pont (E. I.) de Nemours & Co., Wilmington, Del. (77% hydrolyzed).
[10] Acrysol type GS by Rohm & Haas Co., Philadelphia, Pa.
[11] Type 100 by American Cyanamid Co., New York, New York.
[12] Lytron X-886 (Maleic anhydride vinyl acetate copolymer) by Monsanto Chemical Co., St. Louis, Mo.

EXAMPLES 28–31

Table 3

These examples show the use of various amounts of resin with carboxymethylcellulose.

TABLE 3

| Example | 28 | 29 | 30 | 31 |
|---|---|---|---|---|
| CMC Type | 70 M | 70 M | 70 M | 70 M. |
| Resin as percent of CMC | 2 | 5 | 30 | 175. |
| Resin used made per Example | 1 | 1 | 1 | 1. |
| pH of Solution before Casting | 8 | 8 | 8 | 8.5. |
| Film Drying | (4) | (1) | (2) | (3). |
| Film Properties: | | | | |
| Solubility | Partially Soluble. | Insoluble | Insoluble | Insoluble. |
| Percent Insoluble | 62 | 85 | 82 | 83. |
| Percent Swell | | | 25 | 37.5. |

[1] Substantially to dryness at 65° C. under a vacuum of 30 inches of mercury.
[2] 0.5 hour at 105° C.
[3] 24 hours at room temperature.
[4] 1 hour at 70° C.

EXAMPLES 32 and 33

Table 4

Water-soluble polymer films have a tendency to adhere rather firmly to one another when placed in contact and exposed to high humidities. This is especially true where the water-soluble polymer films contain plasticizers, and it is often desirable or necessary to use plasticizers. The art refers to this as "blocking." Blocking presents a problem where the film is rolled upon itself or stored as sheets in contact with one another. Blocking is caused by the high solubility of the polymer and property of the film to absorb moisture under humid conditions. The present invention is quite satisfactory in substantially reducing this blocking as shown by the following experiments.

A 2% aqueous solution of the resin made according to Example 1 above was mixed with a 2% aqueous solution of 70 M CMC. Glycerol plasticizer was added to the resulting solution which was then adjusted to the desired pH and cast and dried on a glass plate. These films were dried at 70° C. for 2 hours. The dried films, which were about 2 mils thick were stored in pairs, one on top of the other, at 100% relative humidity at room temperature for 24 hours under a pressure of 1 pound per square inch. The pressure was used in order to simulate actual storage conditions where the films or sheets are placed in stacks, each stack having several films and the films being arranged one on top of the other. As a control run a second batch of films was prepared and tested as described above, the only difference being that no resin was used. Blocking in the films which contained the resin was substantially reduced, whereas blocking in the films which contained no resin was quite severe. The above and further details of these experiments are summarized in Table 4 below.

TABLE 4

| Example | 32 | 33 |
|---|---|---|
| CMC Type | 70 M | 70 M. |
| Resin as percent of CMC | 0.5 | None. |
| Resin Used Made per Example | 1 | 1. |
| Percent Glycerol | 20 | 20. |
| pH of Solution before Casting | 7.6 | 7.6. |
| Blocking | Only Very Slight. | Very Substantial. |

EXAMPLE 34

Table 5

This example shows the use of the resin of Example 2 hereinbefore. The films were dried in an oven at 105° C. for ½ hour.

TABLE 5

Example 34:
  CMC type _____ 70 M.
  Resin as percent of CMC _____ 20.
  Resin used made per example _____ 2.
  pH of solution before casting _____ 6.2.
Film properties:
  Solubility _____ Insoluble.
  Percent insoluble _____ 85.
  Percent swell _____ 12.

Although the preferred amine/acid/epichlorohydrin molar ratio is about 1/1/1.2, the above examples show variations in this ratio. In addition, we have made resins by essentially the same process as set forth in Example 1 using ratios of 1/1/1.7 and 2/1/2, and we have satisfactorily used these latter resins according to this invention. Although the above examples illustrate preparation of the resins under particular conditions and the use thereof under particular conditions, as disclosed hereinbefore our invention is applicable on a broader scope provided one does not operate outside the following conditions.

(1) Preparation of the polyamide (i.e. reacting the dibasic acid with the polyalkylene polyamine):
  (a) A reaction temperature of 110° C.–250° C.
  (b) A reaction time of ¼ hour–2 hours.
  (c) 0.8/1–1.4/1 mole ratio of polyalkylene polyamine/dibasic acid.
(2) Preparation of the resin (i.e. reacting the polyamide product of 1 above with epichlorohydrin):
  (a) A reaction temperature of 45° C.–100° C.
  (b) A reaction time sufficient to obtain a viscosity (Gardner) of B–E in making 25% solids resins.
  (c) A reaction time sufficient to obtain a viscosity (Gardner) of M–X in making 50% solids resins.
  (d) Using 0.5–1.8 moles of epichlorohydrin for each secondary amine group of the polyamide.
(3) Stabilizing the resin:
  (a) Reducing the pH to at least 6 for resins diluted to 10% solids.
  (b) Reducing the pH to at least 4 for resins of 25% solids.
(4) Insolubilizing reaction (i.e. reacting the resin with the water-soluble polymer):
  (a) Using 0.5%–20% of the resin by weight of the water-soluble polymer.
  (b) Reacting in aqueous solution at 1.5–12 pH.

The foregoing examples illustrate the quite substantial advantages of this invention over the prior art. Thus, the invention provides a means for insolubilizing to a remarkable degree polymers by merely air-drying an aqueous solution thereof at room temperature over a wide range of pH. Without any additional teratment, with carboxymethylcellulose for example, the product is highly resistant to water, acid, and organic solvents; films made from the product have excellent physical properties such as clarity, flexibility, and strength, whereas prior art methods require high temperatures and acid conditions for curing and the resulting films have poor flexibility as well as low tensile strength and elongation properties.

The initial concentration of the water-soluble polymer employed is immaterial, except insofar as it is desirable from a practical standpoint to have a polymer solution of such concentration that it may be readily mixed with the resin and also to have a mixture which is most suitable for film casting or other uses.

An advantage of this investion is that it affords a simple and practical method for introducing a high degree of wet strength into water-soluble polymers, e.g. when cast into films, which would otherwise possess no wet strength. The use in reconstituted tobacco disclosed hereinafter is an example of this wet strength utilization. This is very much in contrast to the poor results obtained with conventional cross-linking agents. For instance, an aqueous solution containing carboxymethylcellulose and 20% formaldehyde (by weight of the carboxymethylcellulose) and another solution in which glyoxal was substituted for the formaldehyde gave films which were completely soluble in water when dried at 105° C. for thirty minutes.

Water-insoluble resin-polymer products of this invention made at a pH within the range of 1.5 to 12 are of good quality; however, a pH range of 6 to 8 is preferred in most cases. The pH range desired will depend in part on the use to be made of the product; however, outside this pH range difficulties are apt to be encountered.

The products of this invention may be prepared either at room temperature or at elevated temperatures. In some instances drying at an elevated temperature gave a somewhat more water-insoluble product and in such cases the higher temperature is preferred if a product of lower solubility in water is desired. Temperatures higher than the 105° C. shown in the examples are applicable, provided one does not reach the char temperature of the composition which will vary with the pH and polymer type involved. Normally the time required to prepare the product will vary inversely with the temperature employed, and also of course with the degree of insolubility desired. Other factors, as will be understood, will influence the time variable. For instance, while in the examples the samples which were air-dried were dried for a period of 24 hours simply by allowing the film to stand at room conditions, this time may be shortened considerably by passing air at a high velocity (e.g., blowing with a fan) over the film. Of course, the relative humidity of the air will also affect the drying time. In some instances, as will be understood, it is desirable to dry under vacuum.

Since neither the resin nor the polymer alone has the desired degree of insolubility in water, at least enough of each must be present to substantially effect this increase in insolubility. Amounts of resin within the range of 0.5% to 175% by weight of the polymer have been used to give products which are more insoluble in water than either the resin or polymer. Neither of these extremes are practical. We must use at least 0.5% resin to insolubilize to the extent required according to our invention. As compared with using 30% resin, no improvement is realized in using greater amounts. In most cases the preferred amount of resin is 0.5%–20% by weight of the polymer being insolubilized.

There are numerous uses in which this invention offers decided advantages. One such use is in the tobacco industry where tobacco fines are made into sheets referred to as reconstituted tobacco. In forming these sheets an aqueous slurry of tobacco comprising carboxymethylcellulose as a film former is spread out and cast or calendered into a sheet and dried at undesirably high temperatures and acid conditions. Glycerin is conventionally added to the slurry as a moisture-regulating agent for the tobacco sheet. It is desirable that the sheet have a substantial amount of strength and resistance to water. Using the product of this invention, we obtain a sheet which is more water-resistant and at the same time avoid the undesirable high temperatures and high acidity. Thus a reconstituted tobacco sheet was made according to this invention as follows. To a mixture of one gram of 70 M type carboxymethylcellulose (same type as used in Example 1), 0.5 gram glycerin, 10 grams of tobacco fines slurried in 80 ml. of water, was added 10 ml. of a 2% aqueous solution of the resin from Example 1. This amounted to an addition of 20% of the resin on the weight of the carboxymethylcellulose. The pH of the resulting slurry was 5.4. A sheet was obtained by casting a sheet of the slurry on a glass plate and drying at 70° C. This sheet was strong and flexible, and being insoluble in water it retained its original form after a period of one hour of soaking in water at 73° F. On the other hand, a sheet prepared as just described, but without any of the added resin of this invention, was soluble in water (73° F.) and disintegrated after soaking therein two minutes. The former sheet was quite satisfactory, whereas the latter was quite unsatisfactory.

In addition to the tobacco use discussed above, this invention is also useful to advantage in any application where a substantially water-insoluble film, coating or other material is desired, and especially where it is desirable to start with a water-soluble system. Thus the invention is applicable (1) as a base for water-soluble inks such as the type used in printing wall paper, wrapping paper, and many other specialty wrappers; (2) as a free film with many obvious applications including, e.g. packaging or wrapping material; (3) as a permanent textile size, e.g. (a) to increase the crush-resistant finish for chiffon or velvet, (b) as a finish for velveteen and corduroy, (c) as a wrap size for upholstery fabric, (d) as an agent to increase the resistance of textile materials to soiling, (e) as a finish for metallic yarns, (f) as a rayon and crepe finish; (4) in protective coatings as a thickening agent and as a binder for pigments to render the coatings washable and scrub resistant; (5) as an additive for insecticide formulations to increase the adhesion of the insecticide to the plant or other material to which the insecticide is applied and also to serve as a protective coating to prevent subsequent erosion from rains, dews, etc.; (6) as a barrier coat to reduce transpiration of moisture from plants to the atmosphere, thereby prolonging the planting season for shrubs and perennials; (7) as a waterproof adhesive.

From the foregoing it will be seen that this invention provides a simple and practical method of insolubilizing water-soluble polymers and water-soluble salts thereof to give a product having an extremely wide range of uses, including the preparation of clear and strong films having good flexibility and at the same time a very high degree of water-insolubility and low water swell characteristics.

As many apparent and widely different embodiments of this invention may be made without departing from the spirit and scope thereof, it is to be understood that we do not limit ourselves to the specific embodiments thereof except as defined in the appended claims.

What we claim and desire to protect by Letters Patent is:

1. Process of preparing a highly water-insoluble and a highly water-insensitive product which comprises the steps of (1) reacting at a temperature of 110° C.–250° C. for ¼ hour–2 hours a polyalkylene polyamine and a saturated dicarboxylic acid having 3–10 carbon atoms employing a polyalkylene polyamine/dicarboxylic acid mole ratio of 0.8/1–1.4/1, thereby producing a polyamide, said polyalkylene polyamine having the formula $H_2N\{(C_nH_{2n})NH\}_yC_nH_{2n}NH_2$ where $n$ is an integer of at least 2 and $y$ is an integer of at least 1 to 7, (2) reacting at a temperature of 45° C.–100° C. said polyamide with epichlorohydrin employing a mole ratio of epichlorohydrin/secondary amine groups of said polyamide of 0.5/1–1.8/1, said reaction being continued until the reaction mixture has reached a Gardner viscosity of B–E and M–X in preparing a 25% and a 50% solids resins, respectively, (3) reducing the pH of an aqueous solution of said polyamide-epichlorohydrin reaction product to such an extent that 10% and 25% aqueous solutions thereof have a pH of not in excess of 6 and 4, respectively, thereby producing a highly stable cationic water-soluble thermosetting resin free of epoxide groups, (4) reacting an aqueous solution of said stable cationic thermosetting resin with an aqueous solution of a water-soluble polymer at a pH of 1.5–12, the amount of said stable cationic thermosetting resin employed being 0.5%–20% by weight of said water-soluble polymer, and (5) finally drying said resin-polymer aqueous solution, said water-soluble polymer having a group selected from those consisting of carboxyl, hydroxyl, amine and amide groups and any combination of said groups, the major part of said water-soluble polymer comprising at least 10 monomer units, said water-soluble polymer being selected from the group consisting of cellulose ethers, cellulose esters, starches, starch ethers, vegetable gums, proteins, and synthetic polymers prepared from ethylenically unsaturated monomers.

2. Process of preparing a highly water-insoluble and a highly water-insensitive product which comprises the steps of (1) reacting at a temperature of 160° C.–210° C. for ¼ hour–2 hours a polyalkylene polyamine and a saturated dicarboxylic acid having 3–10 carbon atoms employing a polyalkylene polyamine/dicarboxylic acid mole ratio of 0.9/1–1.2/1, thereby producing a polyamide, said polyalkylene polyamine having the formula $H_2N\{(C_nH_{2n})NH\}_yC_nH_{2n}NH_2$ where $n$ is an integer of at least 2 and $y$ is an integer of at least 1 to 7, (2) reacting at a temperature of 45° C.–70° C. said polyamide with epichlorohydrin employing a mole ratio of epichlorohydrin/secondary amine groups of said polyamide of 1.0/1–1.5/1, said reaction being continued until the reaction mixture has reached a Gardner viscosity of B–E and M–X in preparing a 25% and a 50% solids resins, respectively, (3) reducing the pH of an aqueous solution of said polyamide-epichlorohydrin reaction product to such an extent that 10% and 25% aqueous solutions thereof have a pH of not in excess of 6 and 4, respectively, thereby producing a highly stable cationic water-soluble thermosetting resin free of epoxide groups, (4) reacting an aqueous solution of said stable cationic thermosetting resin with an aqueous solution of a water-soluble polymer at a pH of 6–8, the amount of said stable cationic thermosetting resin employed being 0.5%–20% by weight of said water-soluble polymer, and (5) finally drying said resin-polymer aqueous solution, said water-soluble polymer having a group selected from those consisting of carboxyl, hydroxyl, amine and amide groups and any combination of said groups, the major part of said water-soluble polymer comprising at least 10 monomer units, said water-soluble polymer being selected from the group consisting of cellulose ethers, cellulose esters, starches, starch ethers, vegetable gums, proteins, and synthetic polymers prepared from ethylenically unsaturated monomers.

3. Process of claim 1 wherein said resulting solution in Step 5 is dried at room temperature.

4. Process of claim 1 wherein said resulting solution in Step 5 is dried at an elevated temperature.

5. The process of claim 1 wherein the water-soluble polymer in Step 5 is a cellulose ether.

6. Process of claim 1 wherein the water-soluble polymer in Step 5 is a starch ether.

7. Process of claim 1 wherein the water-soluble polymer in Step 5 is a vegetable gum.

8. Process of claim 1 wherein the water-soluble polymer in Step 5 is a synthetic polymer prepared from ethylenically unsaturated monomers.

9. Process of claim 1 wherein the water-soluble polymer in Step 5 is carboxymethylcellulose.

10. The product of claim 1.

References Cited by the Examiner

UNITED STATES PATENTS

| 2,832,747 | 4/1958 | Jackson | 260—45.50A |
| 2,882,185 | 4/1959 | Valke et al. | 260—78 |
| 2,926,154 | 2/1960 | Keim | 260—29.2 |

OTHER REFERENCES

"Epoxy Resins," Lee, published by McGraw-Hill Book Company, New York, 1957, pages 30–32.

JOSEPH L. SCHOFER, *Primary Examiner.*

JAMES A. SEIDLECK, *Examiner.*